United States Patent [19]
Murakami

[11] 3,763,314
[45] Oct. 2, 1973

[54] GHOST IDENTIFICATION MEANS IN A TELEVISION RECEIVER

[75] Inventor: Yukio Murakami, Yokohama, Japan

[73] Assignee: Leader Denshi Kabushikikaisha, Yokohama-shi, Kanagaua-ken, Japan

[22] Filed: Feb. 2, 1972

[21] Appl. No.: 222,743

[30] Foreign Application Priority Data

Feb. 15, 1971 Japan .................................. 46/8076

[52] U.S. Cl. .......................... 178/7.3 R, 178/DIG. 4
[51] Int. Cl. .......................... H04n 5/14, H04n 5/44
[58] Field of Search ...................... 178/7.3 R, 7.5 R, 178/7.5 S, DIG. 4, 5.4 M; 325/65

[56] References Cited

UNITED STATES PATENTS 3,482,168 12/1969 Sasao .............................. 178/7.3 R
2,594,382 4/1952 Bedford .......................... 178/5.4 M

FOREIGN PATENTS OR APPLICATIONS 4,535,017 9/1970 Japan ............................ 178/DIG. 4

OTHER PUBLICATIONS

Tekscope, "Tektronix and the World of Television Measurements," Stephen Kerman, 11/71, page 4.

*Primary Examiner*—Robert L. Richardson
*Attorney*—George B Oujevolk

[57] ABSTRACT

A switch normally connected to a horizontal oscillation output circuit is provided at the output of a horizontal oscillation circuit. When ghost is seen, the switch is transferred to a delay circuit, whereby a blanking signal is displayed substantially at the center of a CRT surface. Thus, the ghost is appreciably identified. A further switch normally connected to a video amplifier circuit is provided at the output of a detection circuit. Transferring of the switch causes a video signal to be phase inverted. As a result, the ghost can be appreciably identified.

3 Claims, 8 Drawing Figures

GHOST IDENTIFICATION MEANS IN A TELEVISION RECEIVER

BACKGROUND OF THE INVENTION

1. Field of the Invention

This invention relates to an improved ghost identification means in a television receiver or television set.

2. Description of the Prior Art

Generally, when a television receiver antenna is disposed at a place, the antenna is located such that a maximum field level may be measured by a field strength meter. However, the use of only the field strength meter makes it difficult to find out disturbances in a reproduced picture such as a ghost, noise disturbances and the likes, the ghost being introduced by reflected waves and any other signals which are different from one another in propagation paths, that is, any other signals except for a direct wave.

Therefore, the in prior art, when the ghost is seen, the antenna is connected to the television receiver and the television receiver is actually operated. Then, while television pictures are being watched, the antenna is properly adjusted in regard to its directivity by turning it or it is properly adjusted in regard to its setting and directivity by changing the place where it is set and turning it thereat.

Generally, it is well known that one or more similar pictures are normally displayed at the right of a television picture with respect to an observer as a picture ghost. Since the reproduced picture is continuously changed, the overlaped similar ghost pictures are also changed and complicated so that the ghost may not be readily identified. That is to say, in such a case it is very difficult to determine whether the ghost is present or absent, or strong or weak.

OBJECTS OF THE INVENTION

Therefore, it is a general object of this invention to provide an improved ghost identification means which eliminates the above described disadvantages.

It is another object of this invention to provide an improved ghost identification means which is simple in construction.

It is a further object of this invention to provide an improved ghost identification means wherein the presence and absence of the ghost can be easily determined.

It is a still further object of this invention to provide an improved identification means wherein the ghost can be identified at the presence of the ghost.

SUMMARY OF THE INVENTION

These objects of this invention can be achieved by an improved ghost identification means wherein a signal including horizontal sync pulses or signals during blanking periods are delayed by a delay means in a horizontal sync signal transmission line so that they may be displayed substantially at the center of the CRT surface. Further, these the objects of this invention can be achieved by an improved ghost identification means wherein the ghost can be appreciably identified by inverting the video signal by means of an inverter circuit in the video signal transmission system.

DESCRIPTION OF THE PREFERRED EMBODIMENT

Figure 1:
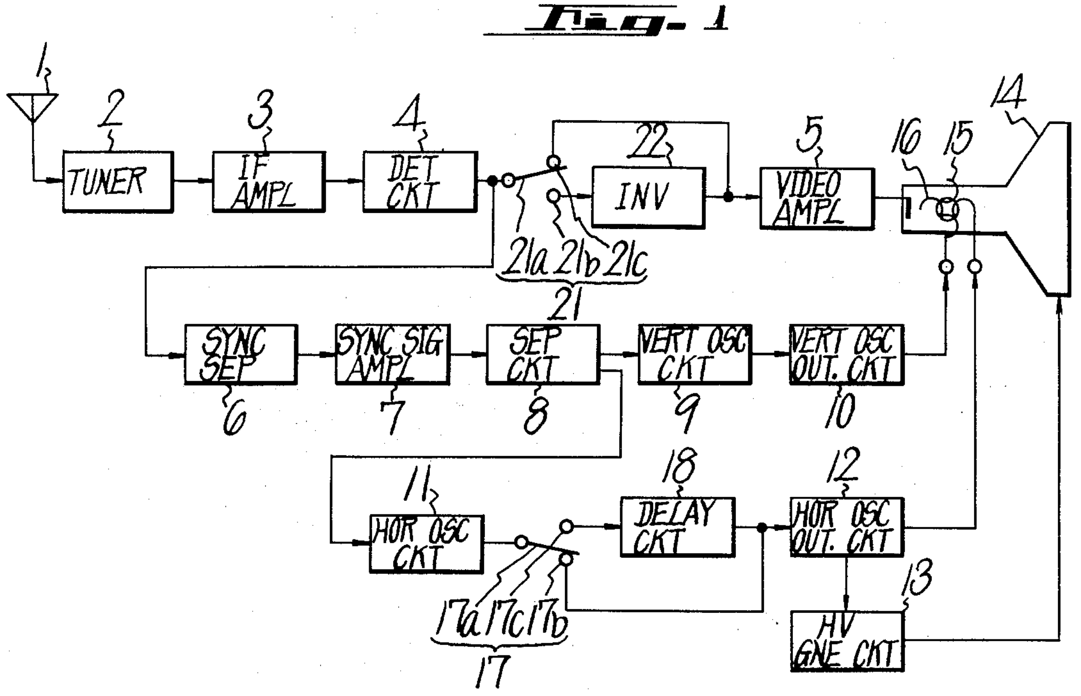
FIG. 1 is a block diagram showng a preferred embodiment of a television receiver provided with a ghost identification means according to this invention.

In FIG. 1, number 1 is an antenna. The antenna is connected to a tuner 2 through a feeder (not shown). The tuner 2 is connected to a detection circuit 4 through an IF amplifier circuit 3. The detection circuit 4 is connected to a cathode of a CRT 14 through a video amplifier circuit 5. The detection circuit 4 is also connected to a horizontal and vertical sync signal separation circuit 8 through a sync separator 6 and a sync signal amplifier circuit 7. The horizontal and vertical sync signal separation circuit 8 is connected to a vertical deflection coil 15 through a vertical oscillation circuit 9 and a vertical oscillation output circuit 10. The separation circuit 8 is also connected through a horizontal oscillation circuit 11 to the input of a horizontal oscillation output circuit 12, one output of which is directly connected to a horizontal deflection coil 16 and the other output thereof is connected to an anode (not shown) of the CRT 14 through a high voltage generation circuit 13. Since the above described television receiver is well known in the art, a further description will not be made.

Now, explanation will be made with respect to a ghost identification means according to this invention in reference to FIGS. 1 through 4. In FIG. 1, a switch 17 is provided in a horizontal sync signal transmission system, for example, at the output of the horizontal oscillation circuit 11. If a normal condition, since a movable contact 17a of the switch 17 is connected to a fixed contact 17*b* thereof which is also connected to the input of the horizontal oscillation output circuit 12, a horizontal oscillation output signal derived from the horizontal oscillation circuit 11 is delivered to the output circuit 12.

On the other hand, when the ghost is suspected, the movable contact 17*a* of the switch 17 is transferred to a fixed contact 17*c* connected to the input of a delay circuit 18, the output of which is connected to the output circuit 12. Therefore, since the horizontal oscillation output signal derived from the horizontal oscillation circuit 11 is delivered to the output circuit 12 through the delay circuit 18, the phase of the horizontal deflection signal is delayed by a predetermined value as compared with that of the horizontal deflection signal in a normal condition. The delay time is may be arbitrarily selected, but it is preferable to be ½ H, where H is one horizontal period.

Figures 2A, 2B:
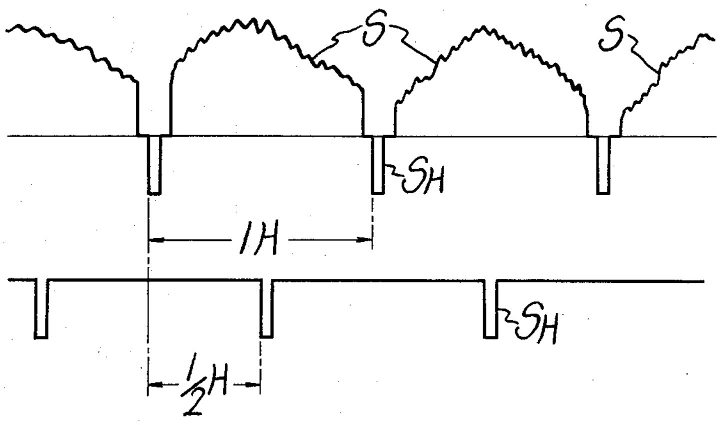
FIGS. 2A through 2C are views for the explanation of the ghost identification means shown in FIG. 1.
Figure 2C:
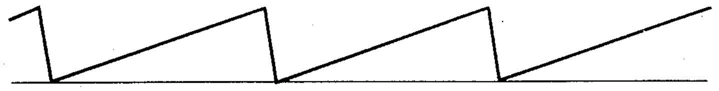
Figures 3A, 3B, 3C:
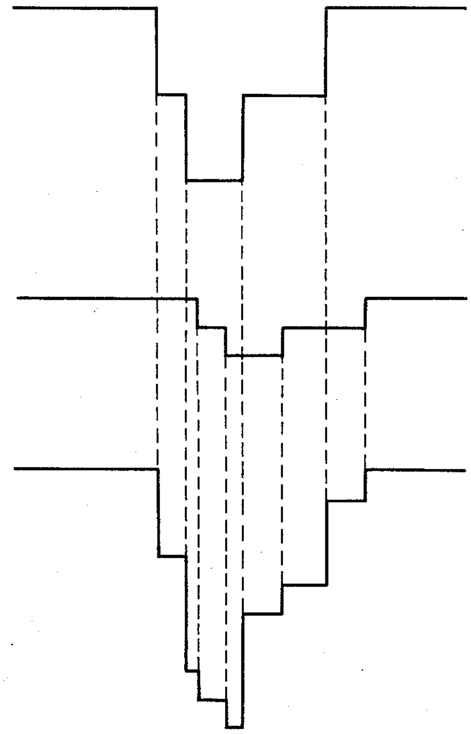
FIG. 3*a* is a view showing a direct signal waveform of a signal including a horizontal sync pulse during a blanking period.
FIG. 3*b* is a view showing a reflected signal waveform of the signal including the horizontal sync pulse during the blanking period.
FIG. 3*c* is a view showing a composite signal waveform of the waveforms shown in FIG. 3*a* and 3*b;*
Figure 4:
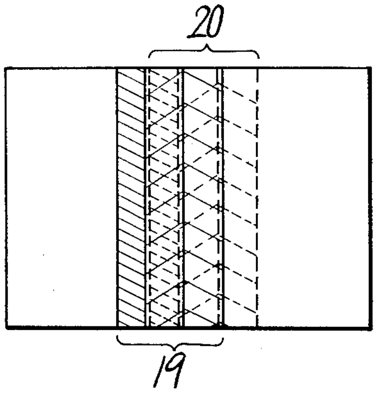
FIG. 4 is a view showing longitudinal stripes displayed on a CRT surface.

According to the instant ghost identification means, when the movable contact 17*a* of the switch 17 is transferred to the fixed contact 17*c*, as shown in FIG. 2B the horizontal blanking periods including horizontal sync signals SH are positioned in time substantially at the center of each of horizontal scanning periods of the composite video signal S including horizontal and vertical sync signals shown in FIG. 2A. Therefore, horizontal deflection currents (or voltages) are dsiplaced in phase by the delay time as shown in FIG. 2*c*, whereby the signals during the horizontal blanking periods are displayed substantially at the center of the CRT surface. Thus, as shown in FIG. 4 a normal blanking image is appreciably displayed as longitudinal stripes 19 on the CRT surface by a direct wave of the signal during the horizontal blanking period shown in FIG. 3*a*. When the signal during the horizontal blanking period is reflected, a ghost image is appreciably displayed as longitudinal stripes 20 (FIG. 4) on the CRT surface by a reflected wave of the signal during the horizontal blanking period shown in FIG. 3*b*. As a result, the ghost image is easily distinguished from the normal blanking image. Therefore, even if pictures for television broadcast are continuously changed, the ghost may be readily identified by displaying the horizontal sync signals during the horizontal blanking periods onto the CRT surface, because the horizontal signals are always constant in phase and amplitude.

Further, according to the present ghost identification means, a phase inverter 22 is selectively inserted into a video signal transmission such as between the detection circuit 4 and the video amplifier circuit 5 through a further switch 21 which is connected to the output of the detection circuit 4. That is to say, when the switch 21 is connected to a fixed contact 21*b* thereof which is also connected to the input of the video amplifier circuit 5, the phase inverter 22 is inserted between the detection circuit 4 and the video amplifier circuit 5. On the other hand, when a movable contact 21*a* of the switch 21 is transferred to a fixed contact 21*c* thereof, the phase inverter 22 is not inserted between the detection circuit 4 and the video amplifier circuit 5.

Thus, when the ghost is not easily identified, the video signal is phase inverted (white–black, or black–white) through transferring of the movable contact 21*a* of the switch 21 to the fixed contact 21*b*, whereby the ghost image can be displayed on the CRT is emphazed by the contrast.

As mentioned above, the ghost indentification means has the advantage that after the antenna is fixed the best reception condition by changing its setting place or its direction at the time when the ghost image is displayed on the CRT surface, good pictures can be reproduced thereon by simply transferring the movable contact 17*a* of the switch 17 to the fixed contact 17*b*.

Further, according to the instant ghost identification means, since the ghost image can be identified by simply inverting the video signal by means of a phase inverter, the operation is not time consuming. And, since the ghost identification means is of simple in construction, a low cost television receiver is available.

This invention is not limited to above described embodiments but various variations and modifications may be made without departing from the scope and spirit of the invention.

I claim as my invention

1. A ghost identification circuit in a television receiver circuit comprising:

a. circuit means for separating horizontal sync signals contained in a video signal;

b. a horizontal oscillation circuit supplied with horizontal sync signals from said circuit means;

c. delay means provided at the output side of said horizontal oscillation circuit;

d. switching means provided at the output side of said horizontal oscillation circuit coupled so as to switch into or to by-pass said delay means; and, e. a horizontal oscillation output circuit; said switching circuit normally connecting said horizontal oscillation output circuit, whereby when said switch means connects said horizontal oscillation circuit to said delay means a picture developed by said horizontal sync signals is displayed on a CRT during a horizontal blanking signal.

2. A ghost identification circuit in a television receiver video signal transmission circuit comprising:

a. a horizontal sync signal transmission system with a delay means disposed therein;

b. a horizontal oscillation circuit and a horizontal oscillation output circuit a first switch means provided at the output side of a horizontal oscillation circuit, said first switching means normally connecting said horizontal oscillation circuit to said horizontal oscillation output circuit, said delay means being adapted to display a picture developed by horizontal sync signals during horizontal blank periods when said first switch means connects said horizontal oscillation circuit to said delay means; and, c. a phase inverter disposed in said delay means; and, c. a phase inverter disposed in said video signal transmission circuit for phase-inverting a video signal applied thereto so as to clearly display a ghost on a CRT.

3. A ghost identification circuit according to claim 2, further comprising a detector and a second switch means provided at the output side of said detector, said second switch means normally connecting said detector to a video amplifier, said phase inverter phase-inverting a video signal when said second switch means connects said detector to said phase inverter to apply the phase-inverted video signal to said video amplifier so as to clearly display a ghost on a television CRT.

* * * * *